(12) United States Patent
Horvitz et al.

(10) Patent No.: US 8,631,419 B2
(45) Date of Patent: Jan. 14, 2014

(54) SYSTEM AND METHODS FOR DISRUPTION DETECTION, MANAGEMENT, AND RECOVERY

(75) Inventors: Eric J. Horvitz, Kirkland, WA (US); Shamsi Tamara Iqbal, Champaign, IL (US); Murugesan S. Subramani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1603 days.

(21) Appl. No.: 11/770,772

(22) Filed: Jun. 29, 2007

(65) Prior Publication Data
US 2009/0006574 A1 Jan. 1, 2009

(51) Int. Cl.
*G06F 3/00* (2006.01)

(52) U.S. Cl.
USPC .......................................................... 719/318

(58) Field of Classification Search
USPC ................................... 719/310, 318; 715/762
See application file for complete search history.

(56) References Cited

U.S. PATENT DOCUMENTS

| | | | |
|---|---|---|---|
| 5,218,530 A * | 6/1993 | Jastrzebski et al. ........... 382/207 |
| 5,555,101 A * | 9/1996 | Larson et al. ................. 358/403 |
| 5,838,306 A * | 11/1998 | O'Connor et al. ............ 345/163 |
| 5,864,656 A | 1/1999 | Park |
| 6,101,617 A | 8/2000 | Burckhartt et al. |
| 6,353,398 B1 | 3/2002 | Amin et al. |
| 6,519,730 B1 | 2/2003 | Ando et al. |
| 6,672,506 B2 | 1/2004 | Swartz et al. |
| 6,741,188 B1 | 5/2004 | Miller et al. |
| D494,584 S | 8/2004 | Schlieffers et al. |
| 6,796,505 B2 | 9/2004 | Pellaumail et al. |
| 6,837,436 B2 | 1/2005 | Swartz et al. |
| 6,888,542 B1 | 5/2005 | Clauss |
| 6,931,522 B1 | 8/2005 | Raghavan et al. |
| 7,010,501 B1 | 3/2006 | Roslak et al. |
| 7,040,541 B2 | 5/2006 | Swartz et al. |
| 7,058,849 B2 | 6/2006 | Erstad |
| 7,062,679 B2 | 6/2006 | Yoshii et al. |
| 7,063,263 B2 | 6/2006 | Swartz et al. |
| 7,069,473 B2 | 6/2006 | Yasuda |
| 7,171,378 B2 | 1/2007 | Petrovich et al. |
| 7,195,157 B2 | 3/2007 | Swartz et al. |
| 7,385,501 B2 | 6/2008 | Miller et al. |
| 7,664,249 B2 | 2/2010 | Horvitz et al. |
| 7,689,521 B2 | 3/2010 | Nodelman et al. |
| 7,743,340 B2 | 6/2010 | Horvitz et al. |

(Continued)

FOREIGN PATENT DOCUMENTS

| EP | 1096381 A2 | 2/2001 |
| EP | 1457869 | 9/2004 |

OTHER PUBLICATIONS

Seongsoo Hong, ARX/ULTRA: A New Real-Time Kernel Architecture for Supporting User-Level Threads, 1997.*

(Continued)

*Primary Examiner* — Lechi Truong

(57) ABSTRACT

A task disruption and recovery system and methods are described that detects shifts away from ongoing tasks, whether by self-interruption or by disruptive events from within or outside a computing system, based on signals detected. Among other functions, the system works to enhance the efficient recovery of suspended tasks or problem-solving sessions via storing and presenting representations of the suspended sessions in a manner that facilitates recovery and continuation.

20 Claims, 8 Drawing Sheets

(56) References Cited

U.S. PATENT DOCUMENTS

| | | |
|---|---|---|
| 7,797,267 B2 | 9/2010 | Horvitz |
| 7,818,755 B1* | 10/2010 | Paquette ................. 719/318 |
| 7,844,666 B2 | 11/2010 | Horvitz et al. |
| 7,877,686 B2 | 1/2011 | Abbott et al. |
| 7,975,015 B2 | 7/2011 | Horvitz et al. |
| 8,024,415 B2 | 9/2011 | Horvitz et al. |
| 2001/0030664 A1 | 10/2001 | Shulman et al. |
| 2002/0054117 A1 | 5/2002 | van Dantzich et al. |
| 2002/0087649 A1 | 7/2002 | Horvitz |
| 2002/0183644 A1* | 12/2002 | Levendowski et al. ....... 600/544 |
| 2003/0191594 A1* | 10/2003 | Kondo et al. ................. 702/80 |
| 2003/0221095 A1 | 11/2003 | Gaunt et al. |
| 2004/0033779 A1* | 2/2004 | Ochi et al. .................. 455/11.1 |
| 2004/0034816 A1 | 2/2004 | Richard |
| 2004/0201500 A1 | 10/2004 | Miller et al. |
| 2005/0266858 A1 | 12/2005 | Miller et al. |
| 2005/0272442 A1 | 12/2005 | Miller et al. |
| 2006/0019676 A1 | 1/2006 | Miller et al. |
| 2006/0041583 A1 | 2/2006 | Horvitz |
| 2007/0011314 A1 | 1/2007 | Horvitz et al. |
| 2007/0100986 A1* | 5/2007 | Bagley et al. ................. 709/224 |
| 2007/0109586 A1* | 5/2007 | Yamada et al. .............. 358/1.14 |
| 2007/0271504 A1 | 11/2007 | Horvitz |
| 2007/0277056 A1* | 11/2007 | Varadarajan et al. ........... 714/15 |
| 2008/0052030 A1* | 2/2008 | Olson et al. .................. 702/127 |
| 2008/0090591 A1 | 4/2008 | Miller et al. |
| 2008/0091537 A1 | 4/2008 | Miller et al. |
| 2008/0161018 A1 | 7/2008 | Miller et al. |
| 2009/0119385 A1 | 5/2009 | Horvitz |
| 2011/0071964 A1 | 3/2011 | Horvitz |

OTHER PUBLICATIONS

International Search Report for PCT Application No. PCT/US2008/067821 completed and mailed Feb. 9, 2009, 11 pages.

Iqbal, et al. "Disruption and Recovery of Computing Tasks: Field Study, Analysis, and Directions." Proceedings of CHI 2007, San Jose California, Apr. 2007, 10 pages.

Scott, et al. "Assisting Interruption Recovery in Supervisory Control in Multiple UAV's" Proceedings of the 50th Annual Meeting of the Human Factors and Ergonomics Society (2006), 5 pages.

Wan, et al. "Assisting Interruption Recovery in Mission Control Operations" HAL2007-03 Humans and Automation Laboratory, MIT (May 2007), pages.

Iqbal, et al. "Conversations amidst Computing: A Study of interruptions and Recovery of Task Activity" UM 2007, Corfu Greece (Jun. 27, 2007), 5 pages.

Landau. "The Checkpoint Mechanism in KeyKOS" (1992) IEEE, pp. 86-91.

Sultan, et al. "System Support for Nonintrusive Failure Detection and Recovery Using Backdoors" (2003) Rutgers University Technical Report DCS-TR-524, 14 pages.

* cited by examiner

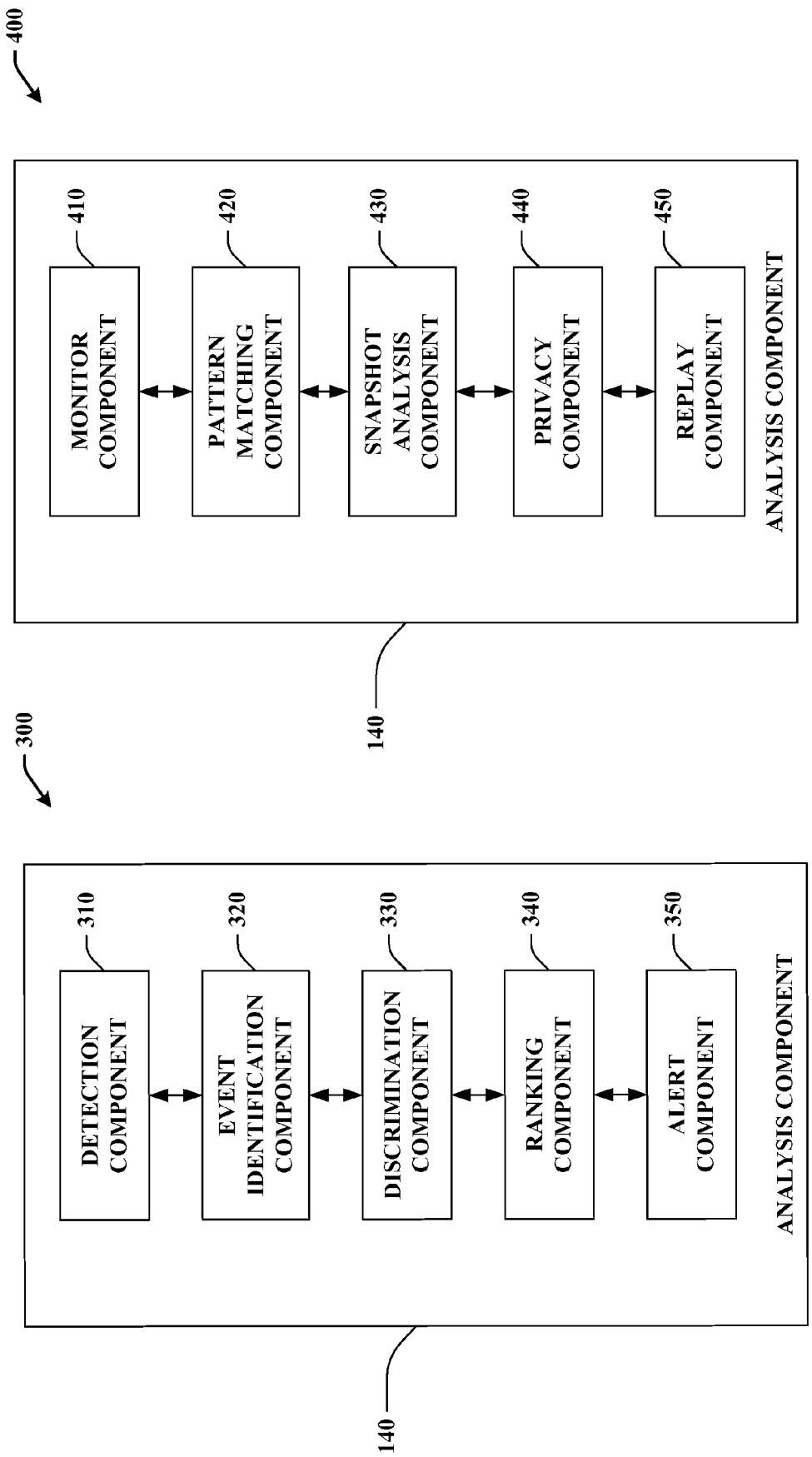

SYSTEM AND METHODS FOR DISRUPTION DETECTION, MANAGEMENT, AND RECOVERY

BACKGROUND

Shifting among different tasks is common in computing. Individuals often switch between multiple active tasks as such multi-tasking is a salient feature of modern life in general, and modern computing in particular. The diversity and number of applications supported by personal computers is astounding. It is not uncommon for individuals to simultaneously execute software applications to support multiple tasks, including word processing and analysis, searching and browsing, and communications.

Most modern operating systems provide multiple tools to promote efficient task shifting (e.g., multiple layered or stacked windows accessible though selected key sequences), however, though such tools are readily available to facilitate task shifting and for the most part such task shifting can now be accomplished in a efficient manner; the obverse from the perspective of the individual—the efficient resumption of those tasks that have been placed in hibernation during the sojourn—has not been achieved.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

A significant portion of task switching in multi-tasking desktop environments can be attributed to external distractions and/or influences, such as for example, email alerts, and the like. Although the timing of shifts or task switching among related and disjoint tasks may be self-directed, a significant portion of task switching can be caused by external distractions and/or influences. A key source of such external influences can be alerts delivered to computer users even when the generating applications are not at the focus of attention. For example, the ubiquitous email notification, where an individual feels compelled to switch to their email application from other applications at focus on perceiving (e.g., hearing, seeing, feeling and/or otherwise sensing) an alert about a newly incoming email.

In the modern multi-application, multi-tasking computing environment, there is a need to allow for efficient task switching and resumption, and techniques to assist with refreshing task context in the face of implicit, explicit and self-motivated task disruption. Accordingly, the subject matter as claimed and disclosed in one aspect relates to systems and methods to utilize the multitasking behavior of individuals in relation to suspension and resumption of tasks, monitoring of software applications and associated windows at the focus of an individual's attention and activities, as well as instant messaging, email alerts and other explicit, implicit and disruptive influences that can severely detract from an individuals focus of attention and instigate individuals to stray from the task at hand and switch to secondary non-essential tasks.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3 provides a more detailed depiction of analysis component in accordance with one aspect of the claimed subject matter.

FIG. 4 provides a further depiction of analysis component in accordance with a further aspect of the claimed subject matter.

DETAILED DESCRIPTION

Figure 1:
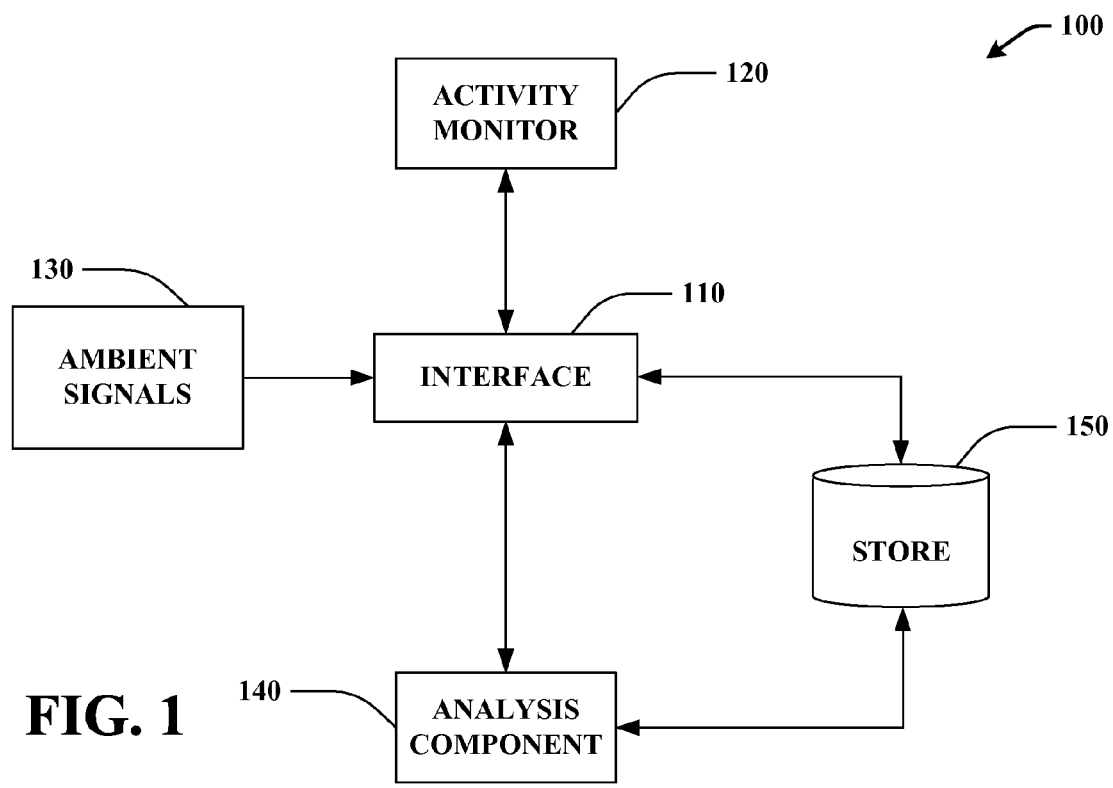
FIG. 1 illustrates a machine implemented system that facilitates and effectuates detection of disruptive events and recovery and resumption from such disruptive events in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Maintaining information awareness and near instant communication in the workplace is becoming increasingly important to knowledge workers to support collaborative practices and increase productivity. However, this need for constant awareness and rapid communication comes with the downside of increased interruptions to ongoing tasks resulting in degradation in overall task performance by the individual, and depending on the level mental acuity (or depth of concentration) expended on a particular task by the individual and the greater the length of the hiatus period, a proportionate increase in the latency duration required to effectively resume suspended tasks is experienced by the individual.

Nevertheless, there is a realization, despite the distracting and disruptive effects associated with interruptions and alerts that such interruptions will continue for the near future to be a major vehicle for conveying information within the multitasking paradigm in a timely and efficient manner. Thus, in recognition of this current reality work has been undertaken to solicit systems and methods that can decrease costs associated with switching amongst various tasks.

It has been observed that inopportune interruptions can primarily be due to increase resumption lag. It has been suggested that if workload of ongoing tasks is high, resulting in usage of a larger number of mental resources, then interruptions cause individuals to divert those resources to interrupting tasks. On return from the interrupting task, individuals have to reallocate those resources to suspended tasks, which become progressively more difficult where the resource usage was initially high with the consequent result of higher resumption lag, which impacts recovery. Moreover, with individuals suspending not merely individual applications, but whole groups of related and ancillary applications, recovery can become progressively more difficult as individuals grapple with and cycle through multiple suspended applications.

As can be appreciated there is not a single factor that can inhibit rapid recovery, but there may be a multitude, such as the time spent on applications prior to interruption and the availability of cues that remind individuals about suspended tasks (e.g., via the visibility of windows of suspended applications). Further, the problem is not only one of resumption of suspended applications, but also one of returning the individual's focus of attention back to suspended tasks, given other individual tasks and/or chains of tasks (e.g., potential chains of disruption) that can compete for the individual's attention following task suspension; and once the individual's focus of attention has once again been drawn to previously suspended tasks, to help the individual to quickly resume where they had left off when they return to continue the task.

FIG. 1 illustrates a machine implemented system 100 that facilitates and effectuates detection of disruptive events (e.g., email notifications, Instant Messenger solicitations, interruptions from supervisors, colleagues, self-motivated, self-directed, and the like) and recovery and resumption from such disruptive events. System 100 can include an interface 110 that can be in communication with activity monitor 120 that monitors activity associated with a user's machine (or session) related activity. Interface 110 can further be in communication with a plethora of ambient signal sensors (e.g., cameras, microphones, heat sensors, motion sensors, temperature sensors, light sensors, etc.) that can be located throughout an individual's work area and that can convey ambient signals 130 to interface 110. Upon receipt of information from activity monitor 120 and ambient signals 130, interface 110 can contemporaneously direct ambient signals 130 and data from activity monitor 120 to analysis component 140 and can persist ambient signals 130 and information from activity monitor 120 to store 150 for prospective analysis and consideration.

Analysis component 140 can continuously assay information emanating from activity monitor 120 and the plurality of signal sensors via ambient signals 130 and either alone or in conjunction with information persisted on store 150 can detect whether an event has occurred, whether the event can be classified as being an interrupting or disrupting event, whether the user should be notified immediately or whether notification should be deferred to later time because the current cost associated with immediately interrupting the user could outweigh the benefits associated with the interruption. For example, analysis component 140 can ascertain, based at least in part on data received from activity monitor 120, ambient signals 130, and persisted information retrieved from store 150, that the interrupting event (e.g., an email alert) pertains and impinges upon a work function that the user is currently working on. Similarly, analysis component 140 can determine, based at least on information obtained from activity monitor 120, ambient signals 130, and persisted information obtained from store 150, that the interrupting event (e.g., an IM message) has no relevance to a users current tasks, that the individual instigating the IM session is a casual acquaintance, and that notification of the disrupting event can be beneficially deferred to a later time when the user is not so involved in the current task.

Additionally, analysis component 140 can continuously and/or intermittently monitor data emanating from activity monitor 120 and ambient signals 130 to detect whether or not a self-motivated or self-induced event has occurred (e.g., whether or not the user has of their own volition shifted their focus away from the task being undertaken, departed their office, etc.), classify whether or not the self-induced or self-motivated event should be classified as being disruptive (e.g., leaving the office after working for 15 hours typically should not be considered a self-disrupting event). For example, analysis component 140 can ascertain in conjunction with data received from activity monitor 120, ambient signals 130, and/or data retrieved and previously persisted on store 150, that a particular event (e.g., without evident cause, visiting a web-news site) relates to a self-motivated interruption that can impinge on a work function that the user is currently undertaking.

Figure 2:
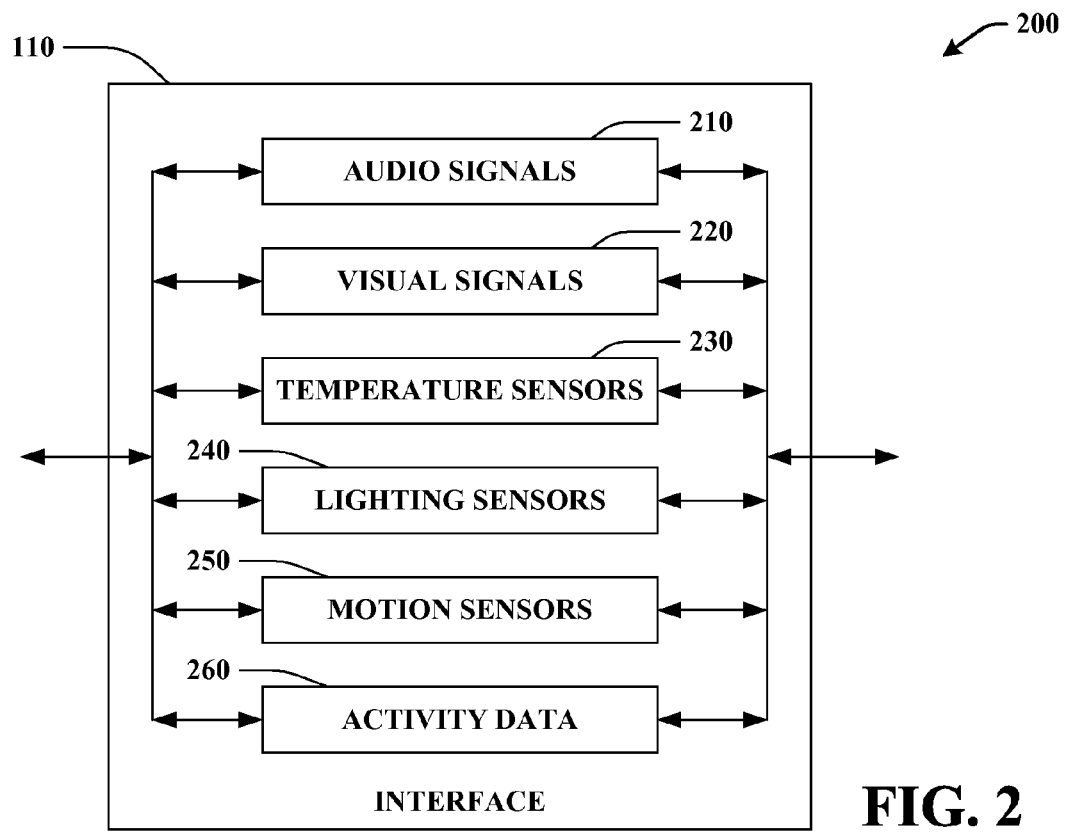
FIG. 2 provides a more detailed depiction of interface in accordance with one aspect of the claimed subject matter.

FIG. 2 provides a more detailed depiction 200 of interface 110. As illustrated interface 110 can receive from one more auditory reception devices (e.g., microphones, telephones, cell phones, Smart phones, and the like) dispersed throughout an individual's work area and associated with the individual, audio signals 210 that can receive auditory information that can pose distraction to the individual. Audio signals 210 can subsequently be used by analysis component 140 (FIG. 1) to determine whether a particular audio signature belongs to a particular individual. For instance, audio signatures of select peoples' (e.g., H, T, and R) voices can have previously been persisted on store 150 and these audio signatures can be employed by analysis component 140 to determine whether or not the person whose voice is detected poses a disruption risk. For example, it can be determined that person H typically provides valuable input and guidance related to the individual's current work product, and as such when H is detected it would be prudent that the individual interrupt (e.g., suspend) whatever he or she is doing and give H his or her undivided attention, and as such analysis component 140 can instigate processes to place current work tasks into a state of hibernation. Similarly, it can have been determined, or can contemporaneously be determined, by analysis component 140 that T occasionally (e.g., 40% of the time) provides tasks and insights related to the individual's current work product, and as such, depending on the relative costs (e.g., where the individual might be in relation to his or her current task) and benefits (e.g., whether T will have any beneficial insights into the current task) analysis component 140 can, depending on the cost/benefit analysis, either commence placing the individuals work product (e.g., open windows, applications, etc.) in stasis, or assume that T has contacted the individual for purposes of conviviality and thus that the current work product need not be suspended and that the disruptive notification can at the least be deferred. Further, in relation to person R it can have been determined, or can contemporaneously be determined, by analysis component 140 that R has no relation whatsoever with any tasks being currently undertaken by the user, and as such communication from R can be ascertained to be a truly disruptive event and thus analysis component 140 can initiate notification deferral and/or notification denial (e.g., never inform the user that R attempted to initiate communications).

Additionally, interface 110 can further receive visual signals 220 from, for example, video cameras dispersed throughout an individual's work area and in the general vicinity of the individual's work area (e.g., the approaches to the individual's work space). These visual signals 220 can be utilized by analysis component 140, via for example, face recognition, gait recognition and other biometric indicia, to identify and subsequently notify the individual to that impending approach of a particular person or group of persons. Analysis component 140 can thus upon identification of a particular individual can take steps to cause work that the individual might be performing to be placed in a suspended state.

Moreover, analysis component 140 can employ visual signals 220 and other pertinent indicia to identify self-motivated interruptions (e.g., the user exiting the working environment at the end of the working day, the user exiting the working environment for a coffee break, etc.). Analysis component 140 upon recognizing such self-motivated interruptions can place tasks currently being performed in stasis. Conversely, analysis component 140 in concert with audio signals 210, visual signals 220, and other received ambient signals, for example, can detect the presence or re-emergence of the user, or the user's shift in attention from the self-directed interruption or the re-focusing of the user's attention back to the tasks at hand (e.g., tasks placed in hibernation). At this stage analysis component 140 can re-establish suspended tasks, remind the user of tasks that need completion, and/or provide the user a putative order or a priority in which the re-established tasks should be undertaken (e.g., via video replay of recent task work, etc.).

Interface 110 can also include temperature, lighting, and motion sensors 230, 240, and 240 respectively, that permits analysis component 140 to determine whether environmental factors pose a threat of distracting the individual from his or her current task. Where analysis component 140, in conjunction with previously persisted data obtained from store 150 ascertains that environmental factors fall outside acceptable and/or previously established and/or individually preferred norms, can adjust the environmental factors accordingly.

Additionally, interface component 110 can also include receiving activity data 260 from activity monitor 120 (FIG. 1). Such activity data 260 received from activity monitor can include the name, size, and location of all windows on a computing system, all opening and closing of windows, user activities, such as, for example, when an individual is actively engaged with software, keyboard and mouse activity, switches among windows, and the actions of saving, cutting, and pasting. Such information can subsequently be utilized to provide individuals a reprise of their activities when and if an interruption or disrupting event occurs and when the individual resumes working on tasks suspended as a consequence of the disrupting event.

FIG. 3 provides a more detailed depiction 300 of analysis component 140 in accordance with one aspect of the claimed subject matter. Analysis component 140 can include detection component 310 that ascertains from information received from interface 110 whether or not an event has occurred. For example, analysis component 140 can be supplied via interface 110 with information from activity monitor 120 that indicates that there has been recent activity associated with a user session. Detection component 310 can investigate the information supplied and determine that the activity monitored constitutes an event worthy of note. Detection component 310 thus having identified an event can convey the associated information to event identification component 320. Event identification component 320 upon receipt of information from detection component 310 ascertains from the conveyed information the type of event that has occurred, determines why the event is or is not to be categorized as a interrupting event, and notes the timeframe in which the event is/was received (this can be germane in determining whether and/or when the user will be notified of the event). Further, event identification component 320 can also undertake analysis to determine how an event constitutes an interrupting event to a particular user (e.g., in conjunction with audio and/or visual information from sensors directed towards the user and the user's focus of attention). Analysis component 140 can further include discrimination component 330 that can, based at least in part, on information supplied by event identification component 320 and information supplied by, and/or obtained from, associated store 150 can ascertain whether a detected and identified event constitutes an event worthy of interrupting the user to attend to the event. Additionally, analysis component 140 can also include ranking component 340 capable of ranking, based at least on a cost-benefit Pareto optimality analysis, of notifications relative to the task/tasks being currently undertaken by the user. Further, analysis component 140 can also comprise an alert component 350 that, influenced at least in part on information provided by other components included in analysis component 140, can ascertain whether to notify a user regarding a notification. The alert component 350 can determine the most appropriate or opportune time, if at all, to notify the user, and the manner in which to provide the notification (e.g. pop-up, providing an audible alarm, visibly flashing the windows, etc.). The manner in which to provide notification to a user can be a function of at least how busy the user is the perceived importance of the disruptive event, the relation the interrupting event to the user current task, and the like.

FIG. 4 provides a further depiction 400 of analysis component 140 in accordance with a further aspect of the claimed subject matter. Analysis component 140 can include monitor component 410 that monitors the use of applications and associated windows and related applications at the focus of an individual's activities, as well as emails and instant messaging, for example. Further analysis component 140 can also include a pattern matching component 420 that can locate patterns of user behavior before disruption occur and after disruptions have been dealt with. More over pattern matching component 420 can identify chains of distractions caused by interrupting events and/or self-interruption events. Additionally, analysis component 140 can also include snapshot analysis component 430 that can analyze, based on chains of distractions and interruptions, and the path and time that a user took to resume tasks that had been placed in suspended state as a result of receiving the distractions, the user's behavior immediately prior to the arrival of the disrupting event, the interval between the arrival of the disrupting event and the users eventual suspension of tasks (e.g., application, window locations, percentage visibility of open window applications, key events corresponding to content manipulation, file retrieval and archival, etc.) that were extant at the point at which the disrupting event was received (e.g., users seemingly preparing to more easily resume where they left off upon return from the interruption). Snapshot analysis component 430 can analyze actions that users perform before suspending ongoing tasks, how long users spend on the break to attend to the disrupting event, the new application instances that are accessed after the suspension of the original set of tasks, and how users return to suspended tasks, if ever.

Analysis component 140 can also include a privacy component 440 that because of the extensive detail of information that can be obtained and persisted about an individual's activities provides a degree of privacy so that confidential and personal information can be safeguarded, for example. Thus privacy component 440 can truncate window titles, selectively persist a subset of keyboard sequences (such as, for example, input of periods and carriage returns that can be indicative of sentence and/or paragraph completion and data entry) utilized by the individual (rather than keep track of every and all keyboard sequences), and shortcuts for saving, cutting, and/or pasting.

Additionally, analysis component 140 can further include replay component 450 that in conjunction with information ascertained, persisted, generated, and/or obtained from one or more input sources and other machine implemented components that can be incorporated within and/or associated with analysis component 140, can provide a audio/visual reprise of the user's actions immediately prior to suspension of the task on which the user was working. Additionally and/or alternatively, replay component 450 can provide salient reminders to the user regarding the applications and tasks that have been suspended (e.g., ensuring that suspended task windows remain visible to users, providing a report of suspended tasks, flashing suspended task windows when the user resumes work after a hiatus, etc.). In order to facilitate and effectuate the provision of salient reminders to get users back on context, analysis component 140 in conjunction with replay component 450 can utilize statistics or richer machine learning to predict or infer when a suspended task will likely not be revisited as soon as a user would like, and automatically remind users (e.g., through replay component 450) at those times, or to create visualizations that show all tasks or tasks that users would most need to be reminded to return to.

Figure 5:
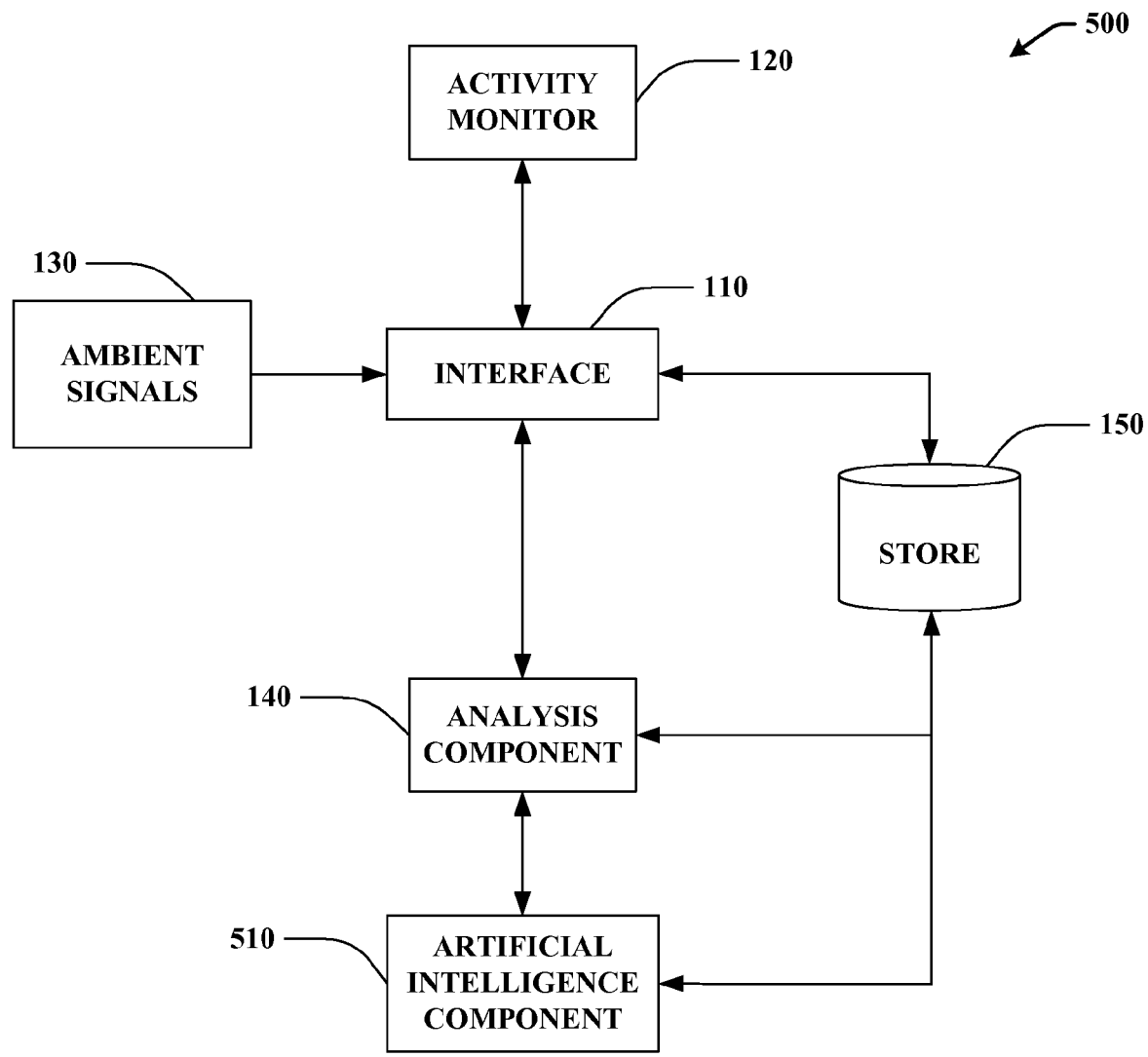
FIG. 5 is a further depiction of a machine implemented system that facilitates and effectuates detection of disruptive events and recovery and resumption from such disruptive events and that includes an intelligence component in accordance with an aspect of the claimed subject matter.

FIG. 5 is a further depiction of a machine implemented system 500 that facilitates and effectuates detection of disruptive events and recovery and resumption from such disruptive events. As illustrated, system 500 includes interface 110 that can be in operative communication with activity monitor 120 that can be effectuate as a background process that continuously monitors activity associated with a user's workstation. Additionally interface 110 can also be in continuous communication with one or more ambient signal sensors that can provide ambient signals 130 information relating to environmental and sensory issues. As stated in relation to FIG. 1, data from activity monitor 120 and received ambient signals 130 can be persisted to store 150 for future by analysis component 140 in conjunction with artificial intelligence component 510.

The artificial intelligence component 510 can be utilized by the analysis component 140 to detect disruptive events. For example, artificial intelligence component 510 can infer, based on information retrieved from store 150 and input received from analysis component 140 whether an event can be classified as being a disruptive event, whether the user should be notified immediately or whether notification should be deferred to some later time, etc.

It is to be understood that the artificial intelligence component 510 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
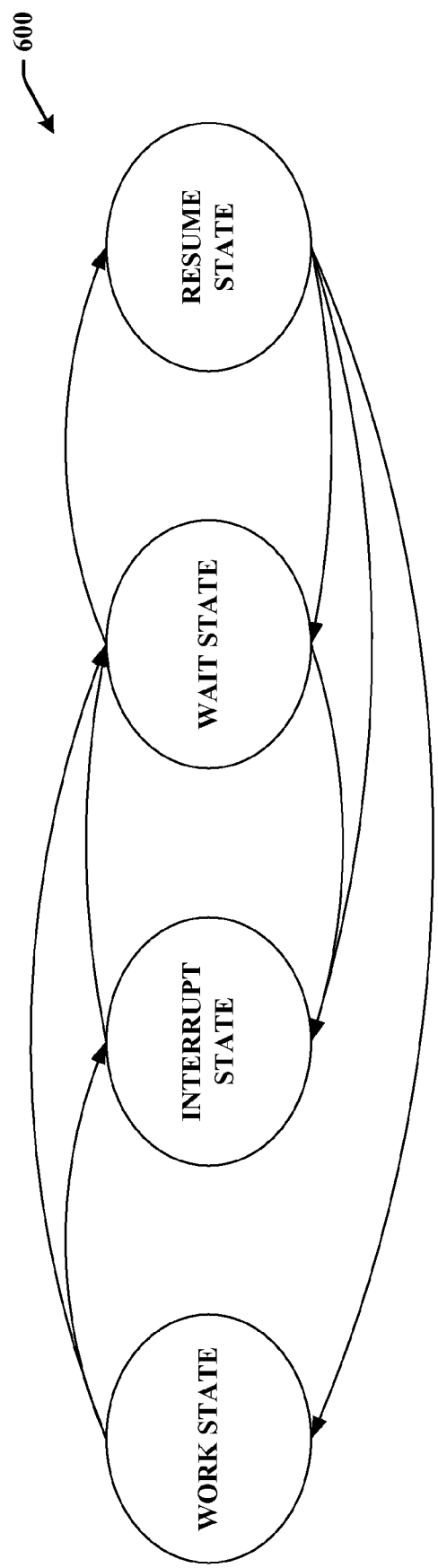
FIG. 6 illustrates an illustrative state diagram that can be employed to effectuate one aspect of the claimed subject matter.

FIG. 6 illustrates an illustrative state diagram 600 that can be employed to effectuate one aspect of the claimed subject matter. As illustrated there are four states, work, interrupt, wait and resume, wherein when a task is in the work state, the task can be taken to an interrupt state when a disrupting event takes place, and thereafter proceeds to a wait state. Alternately, a task situated in a work state can be conveyed to a wait state without going through the interrupt state. This would be the case where a task is placed in a wait state where the wait is not instigated by an externally generated notification, but rather where the interrupt is self motivated by the user. Once the task is placed in a wait state the task essentially is placed in a suspended state waiting for the user to resume his or her session. When the user eventually returns to his or her computer session the task can proceed to a work state provided that the user does not received a further event that can be considered another disrupting event which would result in the task be assigned another interrupt state. Alternately, it might be the case that while the user has resumed his or her session, for reasons of his or her own, the user has decided to commence a task distinct from those that are currently in the wait state, thus leaving the task in a wait state until the user eventually instigates resumption of the suspended task at which point the task proceeds to the work state once again.

Figure 7:
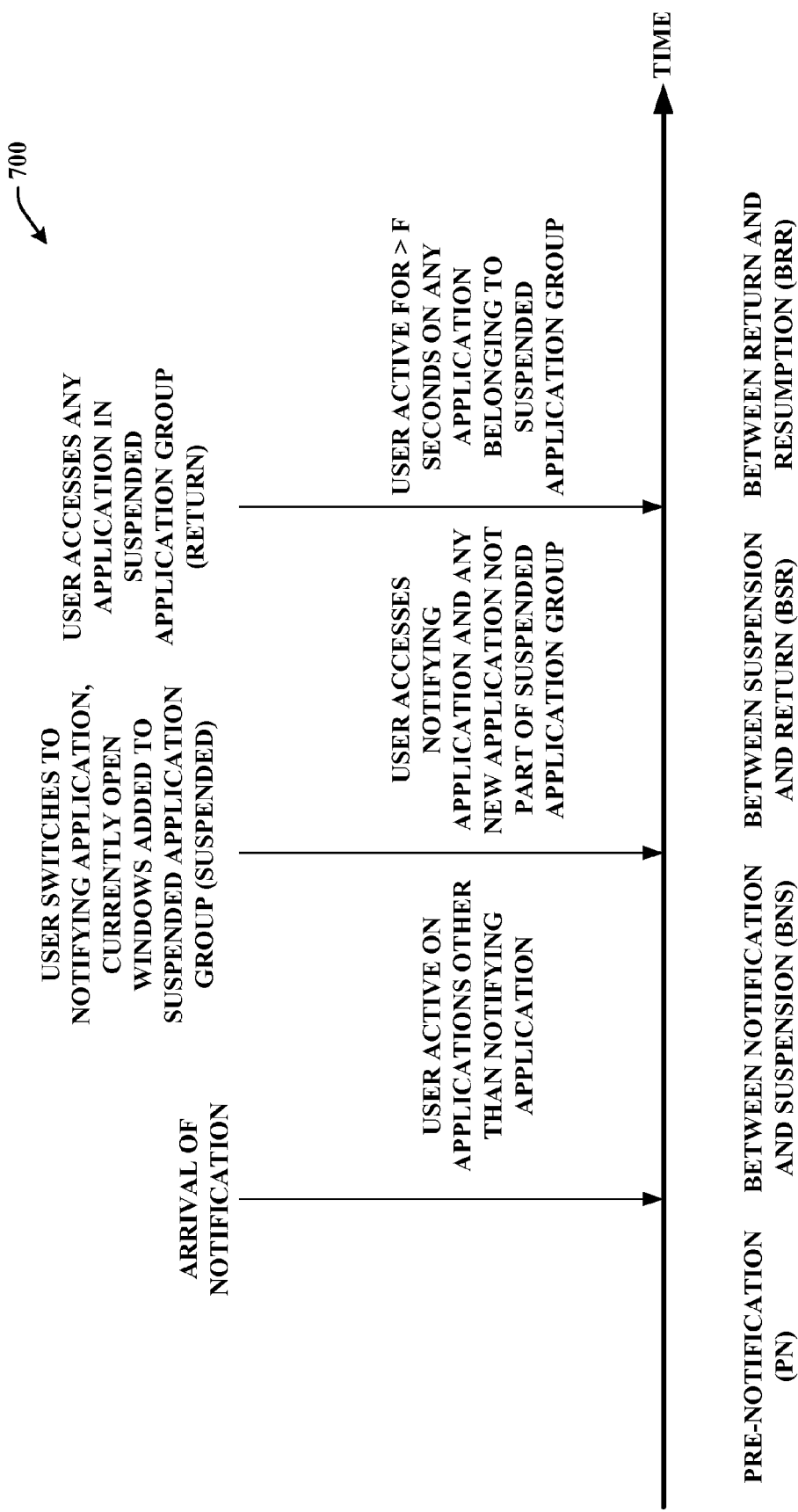
FIG. 7 depicts an illustrative timeline that can be utilized to establish a taxonomy of tasks that influences task switching behavior caused by interruptions.

FIG. 7 depicts an illustrative timeline 700 that can be utilized to establish a taxonomy of tasks that influences task switching behavior caused by the interruption. As illustrated the timeline can be divided into four segments or phases: Pre-notification (PN), between notification and switch (BNS), between switch and return (BSR), and between return and resumption (BRR). Notification is defined as the time when the notification is rendered. Switch is defined as the time when the switch is made to the application generating the notification, with the concomitant suspension of ongoing tasks/applications. Return is defined as the time when the user first starts accessing any application in the group of suspended applications. Resumption is defined as the time when the user becomes active once again in a suspended application. Since there are cases where users can be active in an application yet not have any visible activities that can be tracked (e.g., reading a page of text, etc.) one can employ a simple heuristic to determine resumption. For example, a user can be considered to have resumed an application when he or she has spent more than 10 seconds on a suspended application, which is typically more time than required for tabbed browsing.

Figure 8:
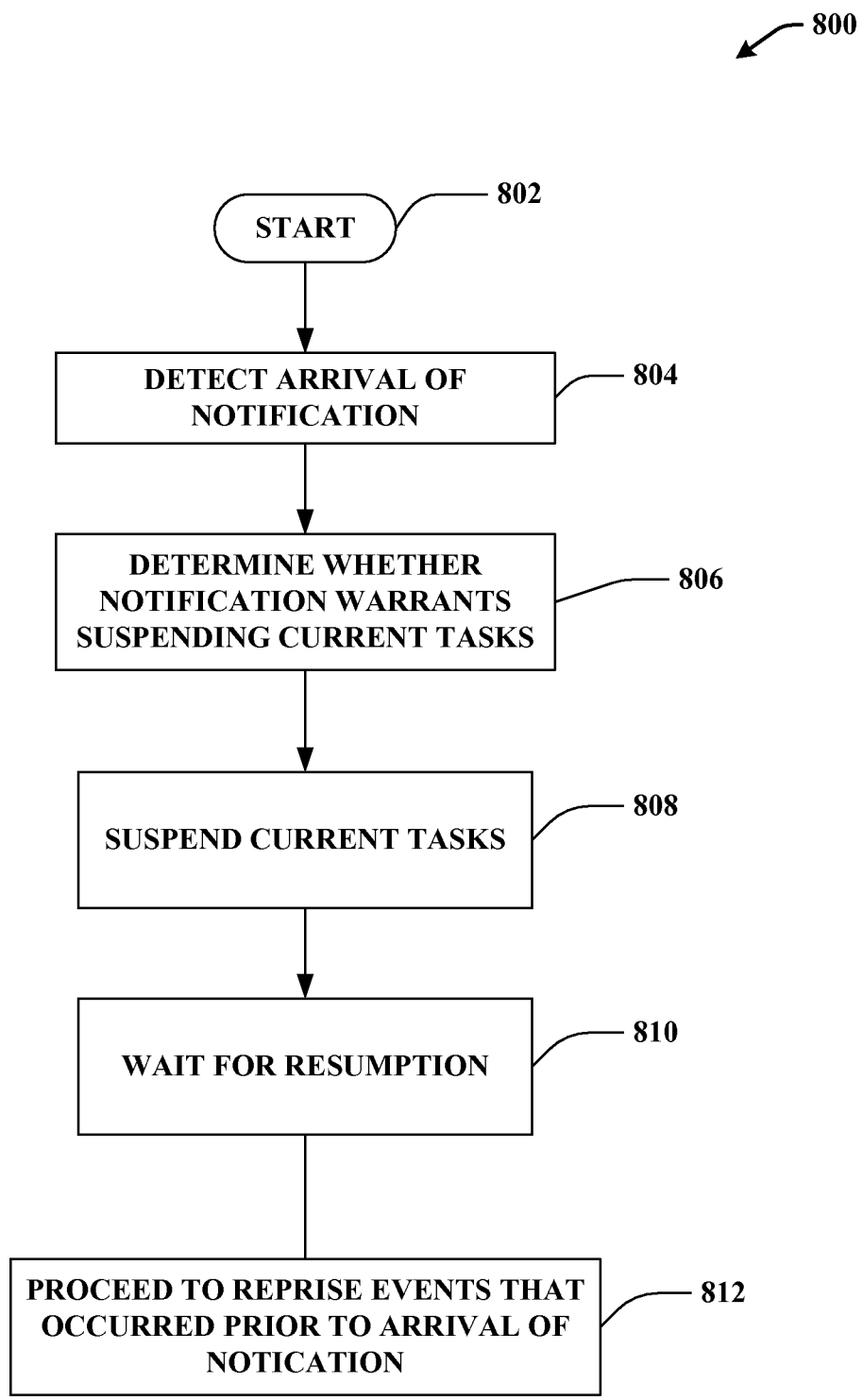
FIG. 8 illustrates a flow diagram of a methodology that facilitates and effectuates efficient detection of disruptive events and recovery and resumption from such disruptive events in accordance with an aspect of the disclosed and claimed subject matter.

In view of the exemplary systems shown and described supra, methodologies that may be implemented in accordance with the disclosed subject matter will be better appreciated with reference to the flow chart of FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 8 illustrates a flow diagram 800 illustrates a flow diagram of a methodology that facilitates and effectuates detection of disruptive events and recovery and resumption from such disruptive events. Method 800 commences at 802 whereupon various and sundry initialization tasks and background activities are performed. Upon completion of these various tasks and activities, method 800 proceeds to 804 where a notification emanating from an email application, for example, is received. At 806 the method assesses whether the notification that has been received warrants classification as being a disruptive or interrupting event sufficient to warrant tasks that the user is currently working on to be placed in a suspended state so that the user can attend to satisfying the notification. At 808 current tasks are suspended, herein snapshots are taken of current settings of windows, locations of windows, data is saved, selected keyboard and mouse click sequences are saved, working files are persisted, and a plethora of other tasks performed to place the suspended task in a stasis state ready to be resumed. At 810 the method awaits the user to return from the distracting event so as to revive the suspended task. Once a user returns and commences activity in his or her session, the method at 812 can prompt the user to determine whether the user wishes to resume suspended tasks, and/or can automatically provide an audio/visual reprise of the user's computer session, or last X minutes of the computer session, where X is a number equal to or greater than 0, so the computer user can refresh his or her memory as to where he or she left off and can quickly and efficiently resume the previously suspended task.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g. methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Machine learning and reasoning (e.g., the construction and use of explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 9:
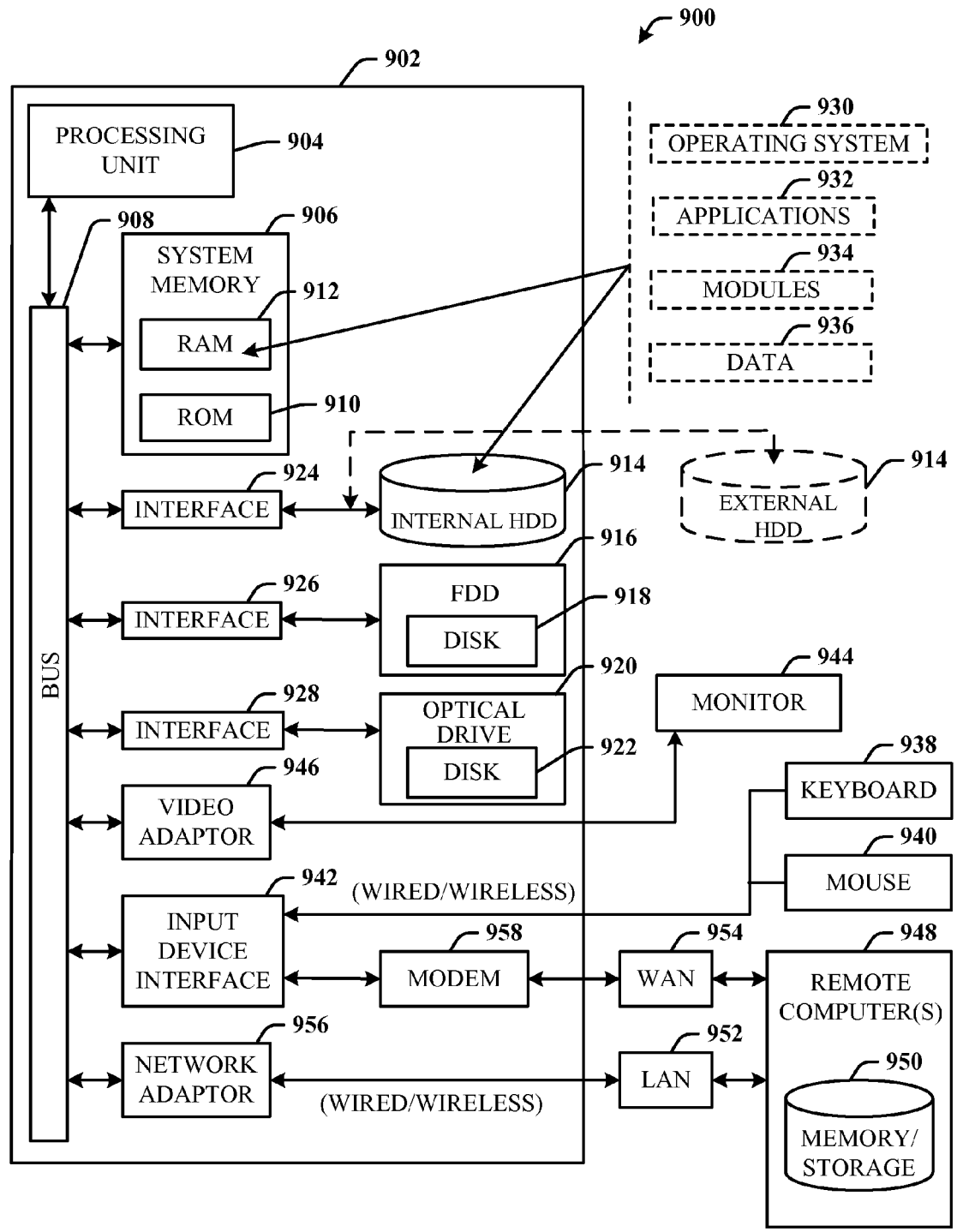
FIG. 9 illustrates a block diagram of a computer operable to execute the disclosed inference-based query completion architecture.

Referring now to FIG. 9, there is illustrated a block diagram of a computer operable to execute the disclosed system. In order to provide additional context for various aspects thereof, FIG. 9 and the following discussion are intended to provide a brief, general description of a suitable computing environment 900 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g. EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the claimed subject matter can be implemented with various commercially available operating systems or combinations of operating systems.

A user can enter commands and information into the computer 902 through one or more wired/wireless input devices, e.g. a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 10:
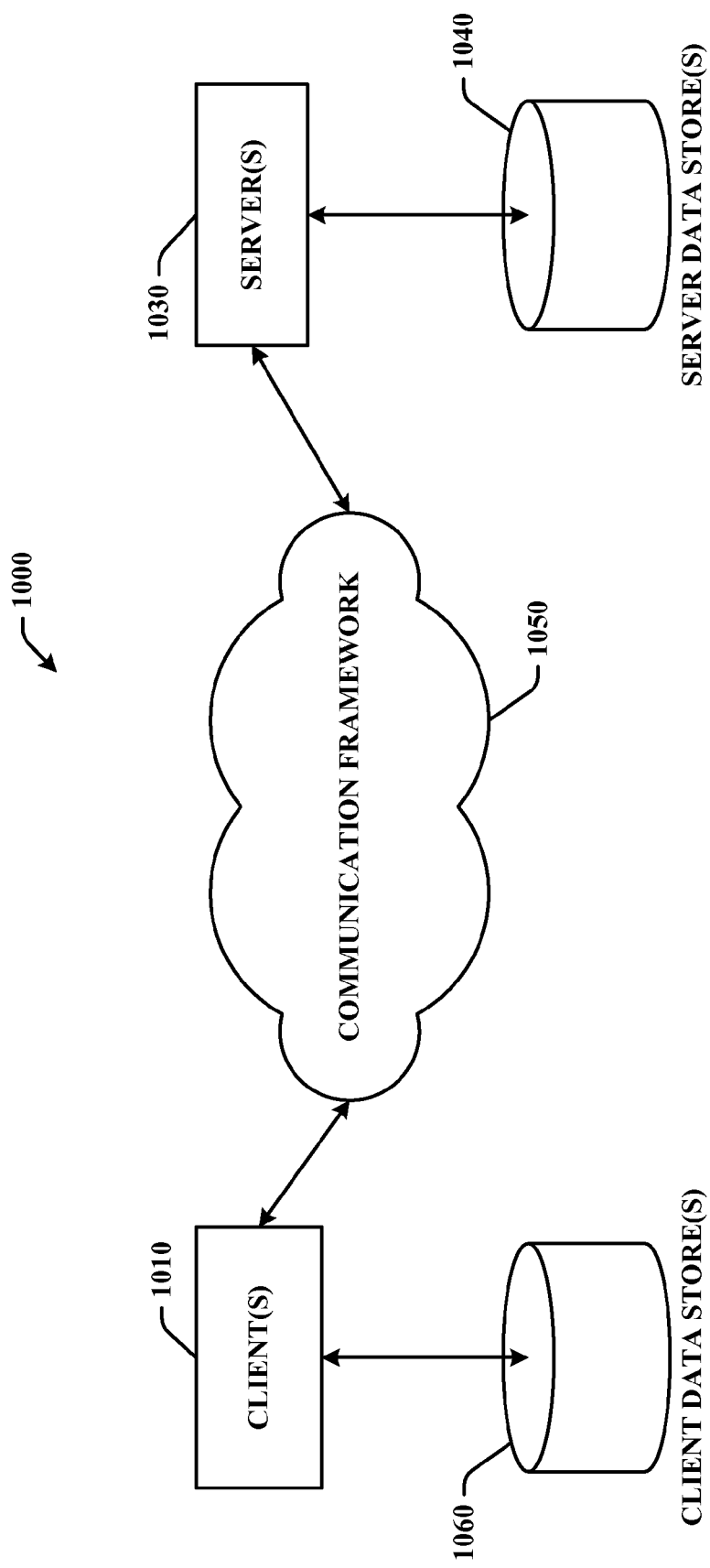
FIG. 10 illustrates a schematic block diagram of an exemplary computing environment for processing the inference-based query completion architecture in accordance with another aspect.

Referring now to FIG. 10, there is illustrated a schematic block diagram of an exemplary computing environment 1000 for processing the inference-based query completion architecture in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates and effectuates detection of disruptive events, comprising:
   at least one processor;
   an analysis component, executing on the at least one processor, that comprises:
   a detection component that receives a signal from a reception component and utilizes the signal to detect an event;
   a discrimination component that determines whether the event is classifiable as being an interrupting event;
   an alert component that alerts the user of the event and places currently executing tasks associated with the user in a suspended state based at least in part on the determination that the event is classifiable as being an interrupting event;
   a ranking component that generates a ranked list of tasks placed in stasis to provide notification of suspended tasks to the user;
   a snapshot component that saves settings of the currently executing tasks before entering the suspended state; and
   a monitor component that detects activity associated with resumption of a session by the user and places the tasks in a work state using the saved settings.

2. The system of claim 1, wherein the signal is obtained from sources that include at least one of: auditory sensors, visual sensors, and an activity monitor.

3. The system of claim 1, wherein the ranked list is employed to provide visual notification of the suspended tasks to the user.

4. The system of claim 1, wherein the analysis component further comprises a replay component to provide, based at least in part on activity associated with resumption of the session by the user, an audio and/or visual reprise of the session for a user definable threshold period preceding the event.

5. The system of claim 4, wherein the replay component utilizes data persisted on a data store, the data persisted on the data store received by the reception component.

6. The system of claim 1, wherein the analysis component further comprises a pattern matching component that utilizes the signal received from the reception component and data persisted on a data store to identify patterns corresponding to the event.

7. The system of claim 1, wherein the analysis component further comprises a privacy component that ensures that sensitive information acquired by the reception component is selectively vetted before being persisted to a data store.

8. The system of claim 7, wherein the sensitive information acquired by the reception component comprises one or more of window titles and keyboard sequences entered by the user.

9. The system of claim 1, wherein the discrimination component further determines whether the event is classifiable as being an interrupting event based on the signal and previous signals persisted to a data store.

10. The system of claim 1, further comprising an intelligence component employed by the analysis component to ascertain whether the event is classifiable as being an interrupting event.

11. A method for facilitating and effectuating detection of disruptive events, comprising:

with at least one processor:
- detecting an event based on a received signal;
- determining whether the event is classifiable as being an interrupting event;
- alerting a user of the event based at least in part on the determination that the event is classifiable as being an interrupting event;
- placing currently executing tasks associated with the user in a suspended state based at least in part on the determination that the event is classifiable as being an interrupting event;
- generating a ranked list of tasks placed in stasis to provide notification of suspended tasks to the user;
- saving settings of the currently executing tasks before entering the suspended state; and
- detecting activity associated with resumption of a session by the user and placing the tasks in a work state using the saved settings.

12. The method of claim 11, further comprising providing an audio and/or visual reprise of the session for a user definable threshold period preceding the event based at least in part on the detected activity associated with resumption of the session by the user.

13. The method of claim 11, further comprising utilizing the received signal and data stored in a data store to identify patterns corresponding to the event.

14. The method of claim 11, further comprising ensuring that sensitive information acquired via the received signal is selectively vetted before being stored in a data store.

15. The method of claim 14, wherein the sensitive information acquired via the received signal comprises one or more of window titles and keyboard sequences entered by the user.

16. The method of claim 11, wherein determining whether the event is classifiable as being an interrupting event is based on the signal and previous signals stored in a data store.

17. The method of claim 11, further comprising employing artificial intelligence to ascertain whether the event is classifiable as being an interrupting event.

18. A computer readable storage device having instructions stored thereon for execution by a processor to perform a method comprising:
- detecting an event based on a received signal;
- determining whether the event is classifiable as being an interrupting event;
- alerting a user of the event based at least in part on the determination that the event is classifiable as being an interrupting event;
- placing currently executing tasks associated with the user in a suspended state based at least in part on the determination that the event is classifiable as being an interrupting event
- generating a ranked list of tasks placed in stasis to provide notification of suspended tasks to the user;
- saving settings of the currently executing tasks before entering the suspended state; and
- detecting activity associated with resumption of a session by the user and placing the tasks in a work state using the saved settings.

19. The computer readable storage device of claim 18, wherein the method further comprises providing an audio and/or visual reprise of the session for a user definable threshold period preceding the event based at least in part on the detected activity associated with resumption of the session by the user.

20. The computer readable storage device of claim 18, wherein the method further comprises utilizing the received signal and data stored in a data store to identify patterns corresponding to the event.

* * * * *